United States Patent [19]

Ahn et al.

[11] 3,996,095

[45] Dec. 7, 1976

[54] EPITAXIAL PROCESS OF FORMING FERRITE, $Fe_3O_4$ AND $\gamma Fe_2O_3$ THIN FILMS ON SPECIAL MATERIALS

[75] Inventors: Kie Yeung Ahn, Chappaqua; Christopher Henry Bajorek, Goldens Bridge; Robert Rosenberg, Peekskill; King-Ning Tu, Mahopac, all of N.Y.

[73] Assignee: International Business Machines Corporation, Armonk, N.Y.

[22] Filed: Apr. 16, 1975

[21] Appl. No.: 568,540

[52] U.S. Cl. ............................... 156/610; 204/192; 340/174 TF; 360/113; 360/131; 427/131; 428/469; 156/612; 156/DIG. 74; 23/DIG. 1

[51] Int. Cl.[2] ..................... B01J 17/30; B05D 5/12; C23C 15/00

[58] Field of Search ........... 204/192; 427/131, 129, 427/132; 340/174 TF; 360/113, 131; 428/469; 156/610, 612, DIG. 74; 23/DIG. 1

[56] References Cited

UNITED STATES PATENTS

| | | | |
|---|---|---|---|
| 3,161,946 | 12/1964 | Birkenbeil | 204/192 X |
| 3,420,756 | 1/1969 | Terajima | 204/38 |
| 3,480,922 | 11/1969 | Flur et al. | 340/174 |
| 3,520,664 | 7/1970 | York | 29/195 T |
| 3,691,032 | 9/1972 | Luborsky et al. | 204/40 |

*Primary Examiner*—John H. Mack
*Assistant Examiner*—Aaron Weisstuch
*Attorney, Agent, or Firm*—Graham S. Jones, II

[57] ABSTRACT

A first thin film of appropriate texture, lattice constant, and crystal structure, such as body centered cubic vanadium or chromium with (110) texture is deposited upon a rigid or flexible substrate forming a plurality of polycrystals. A ferrite such as magnetite ($Fe_3O_4$) is sputtered from a target onto the first thin film forming a mixture of $\gamma Fe_2O_3$ and $Fe_3O_4$ substantially completely without formation of Fe or other oxides of iron, providing good magnetic characteristics and resistance to corrosion. The substrate temperature can be maintained as low as 200°C for both steps when sputtering or evaporation is employed.

14 Claims, 7 Drawing Figures

EPITAXIAL PROCESS OF FORMING FERRITE, $Fe_3O_4$ AND $\gamma Fe_2O_3$ THIN FILMS ON SPECIAL MATERIALS

BACKGROUND OF THE INVENTION

1. Field of Invention

This invention relates to a low-temperature method of depositing magnetic iron oxide films, ferrites, and, more particularly, to a method of formation of magnetite ($Fe_3O_4$) and $\gamma Fe_2O_3$ films on a substrate which is not a single crystal. The results produced are useful as magnetic recording media and magnetic recording head layers.

2. Description of the Prior Art

Thin film magnetite films have been specifically described in U.S. Pat. No. 3,860,450 of Nicolet et al., for a "Method of Forming Magnetite Thin Film," in which a thin film of iron is deposited onto a substrate by vacuum deposition, decomposition of iron carbonyl or R.F. sputtering onto a substrate from an iron target. Then the iron is oxidized by heating at 450°–550° C in the presence of oxygen and more iron is deposited upon the resultant iron oxide, which comprises principally hematite ($\alpha Fe_2O_3$). Then the resultant films are annealed preferably in a vacuum at 350° to 400° C to yield a green magnetite ($Fe_3O_4$) film. Then the excess iron is stripped away from the underlying magnetite film by means such as dipping the coated substrate in a nitric acid solution.

The above film possesses desirable magnetic characteristic, but is unsuitable for use as a high-density magnetic recording medium because of the roughness of the resultant film, with peaks-to-valleys on the order of or greater than 1000A (0.1 micron). The roughness is caused by the step of thermal oxidation.

Even if the above film were sufficiently smooth, it would be unsuitable for use with flexible magnetic recording substrates such as flexible discs and tapes because of the high temperatures of 450° and 350° C required for the two steps involved which would totally destroy most flexible media substrates.

A question may be raised as to why $\alpha Fe_2O_3$ and Fe are undesirable in such thin films. Coupled with that question is a further question as to why iron oxide, ferrites, and particularly $Fe_3O_4$ cannot be sputtered successfully by conventional techniques onto amorphous substrates to yield high quality magnetic films. These questions are answered by the fact that while ferrites, $\gamma Fe_2O_3$ and $Fe_3O_4$ possess desirable magnetic properties, $\alpha Fe_2O_3$ and Fe do not, and even small quantities of them in a structure containing $\gamma Fe_2O_3$ and/or $Fe_3O_4$ hurt the magnetic properties of the thin film. Pure Fe in the films is undesirable because it would make the films susceptible to corrosion. Further, when an iron oxide is sputtered onto an amorphous substrate without epitaxial constraint, substantial amounts of Fe and/or $\alpha Fe_2O_3$ are formed, leading to unacceptably poor magnetic properties. See U.S. Pat. Nos. 3,342,632 of Bate et al., 3,342,633 of Bate et al., 2,853,401 of Rogers, and 3,829,372 of Heller.

In an article by H. Takei et al., "Vacancy Ordering in Epitaxially Grown Single Crystals of $\gamma Fe_2O_3$," Journal of the Physical Society of Japan, Vol. 21, p. 1255 (1966), epitaxial chemical vapor deposition of $Fe_2O_3$ at 600°–700° C on a single crystal MgO substrate allows synthesis of single crystal $\gamma Fe_2O_3$ films. This approach is adequate only where the great cost and expense of providing a single crystal MgO substrate can be justified, which is not usually the case. See U.S. Pat. No. 3,498,836 of Gambino related to epitaxial deposition of ferrites on an MgO single crystal, but at temperatures in the range of 1050° – 1300° C.

U.S. Pat. No. 3,520,664 of York discloses a thin film structure with a substrate of a metal or a dielectric such as glass coated with a first film of an adhesive metal such as Cr, Ta, Nb, or Mo. Next, is an insulating layer such as SiO. The next layer is an electrically discontinuous nucleating layer such as Ag, Cr, Co, Ta, Fe, Au, Ni, V, and Ti. The final layer is an Ni, Fe, or an Ni, Mo, Fe form of permalloy. The nucleating layer is intended to provide "nucleating centers around which a subsequent magnetic film may grow. Thus, the layer of nucleating material serves to form small agglomerations, evenly dispersed over the surface of the insulating layer."

The nucleating layer is not intended to provide an epitaxial influence on the subsequent magnetic layer, but it is intended to precondition the substrate surface to favor the formation of a better defined magnetic film. These nucleating layers play no role in controlling the stoichiometry of the permalloy deposited on the film. Such discontinuous layers would prevent formation of uniform and stoichiometric ferrite films, particularly $\gamma Fe_3O_3$ and $Fe_3O_4$. Silver is face centered cubic, but has improper lattice parameters. Titanium has a hexagonal crystal structure which is the wrong crystal structure. Tantalum has a body-centered cubic structure, but has dimensions of 9.33A by 9.90A which is inappropriate. See Table II below and the further discussion in connection with it.

U.S. Pat. No. 3,515,606 shows a layer of 300A of chromium on a glass substrate covered with 1500A of NiFe where the chromium is added to increase adhesion.

U.S. Pat. No. 3,516,860 shows a layer of chromium deposited on a glass disc with a layer of CoAg recording medium deposited on the chromium.

U.S. Pat. No. 3,677,843 of Reiss also describes permalloy layers on chromium.

U.S. Pat. No. 3,441,429 of Hacskaylo describes vacuum deposition of $Fe_3O_4$ mixed with $B_2O_3$.

U.S. Pat. No. 3,787,237 of Grunberg et al describes alternate layers of Cr, Co, Cr, Co with the Cr layers as thin as possible to form a thin film with a high coercive field.

OBJECTS AND SUMMARY OF THE INVENTION

An object of this invention is to provide extremely smooth and stable iron oxide and ferrite thin films with desirable magnetic characteristics.

Another object of this invention is to provide such films by means of a process which can be performed successfully at a low temperature on the order of 200° C or less, although it could be performed successfully at much higher temperatures approaching 400° C as well.

In accordance with this invention, a method is provided for forming an iron oxide film comprising the steps of depositing a first film having an inherent crystal structure favoring formation of ferrites, $\gamma Fe_2O_3$ and $Fe_3O_4$ in subsequent deposits thereon, and then depositing an iron oxide on the first film.

Further, in accordance with this invention, a method is provided for forming iron oxide composed substantially of $\gamma Fe_2O_3$ and Fe3$O_4$ including depositing preferably 2000A of a metal film selected from chromium and vanadium at a substrate temperature below about 225° C and depositing a film of iron oxide at a temperature below about 225° C on the metal film epitaxially. The overall acceptable range is 200A to 10,000A.

Table I

| EPITAXY | | | |
|---|---|---|---|
| Mtl. | Crystal Type | Lattice Constants a | Proper Texture |
| $\alpha Fe_2O_3$ | Rhombohedral $Al_2O_3$ | — | None |
| $Fe_3O_4$ | Cubic Spinel | 8.39A | (100) |
| $\gamma Fe_2O_3$ | Cubic $Fe_3O_4$ | 8.30A | (100) |
| $MgAl_2O_4$ (Spinel) | Cubic | 8.50A | (100) |
| MgO | Cubic NaCl | 4.2A | (100) |
| Cr | b.c.c. | 2.88A | (110) |
| V | b.c.c. | 3.03A | (110) |

Films of b.c.c. materials deposited on amorphous substrate yield (100) but most often (110) texture; whereas films of f.c.c. material deposited on amorphous substrate generally yield (111) texture.

Figure 1A:
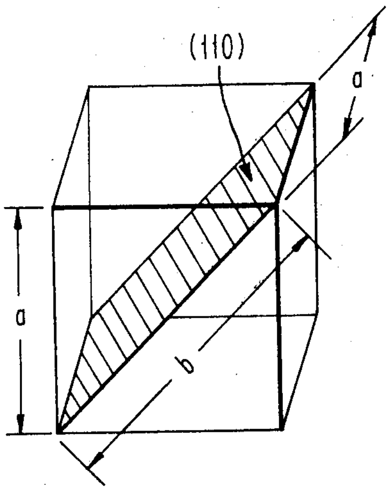
FIG. 1A shows a basic cube cell of an element such as chromium or vanadium.
Figure 1B:
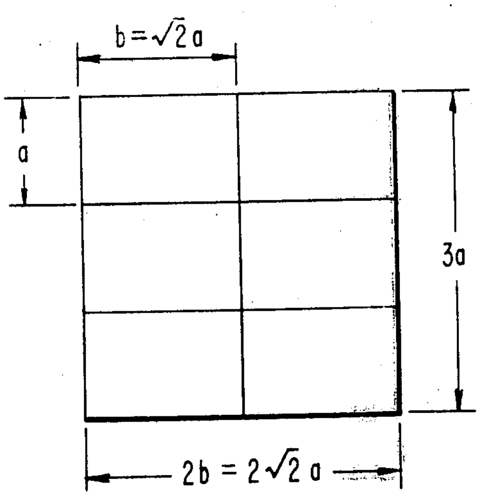
FIG. 1B is a diagram of a two-cell-by-three-cell array of the (110) plane of an element such as chromium or vanadium, with ideal dimensions matching $Fe_3O_4$.
Figure 1C:
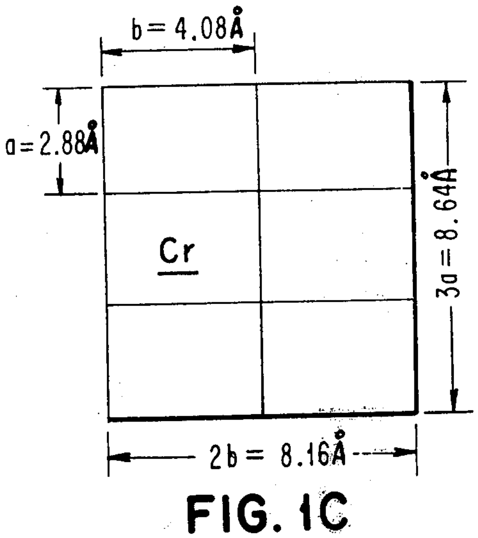
FIG. 1C is a diagram according to FIG. 1B for chromium.
Figure 1D:
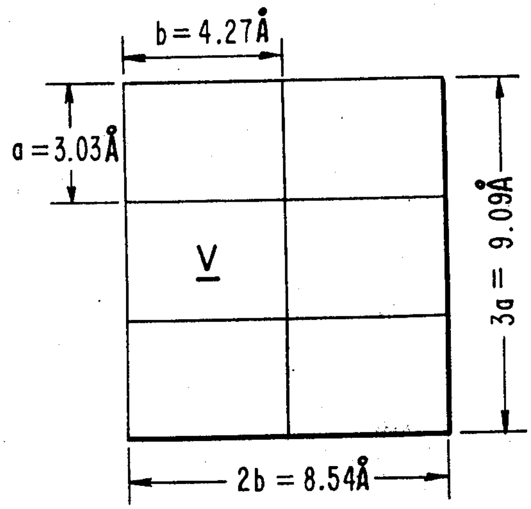
FIG. 1D is a diagram according to FIG. 1B for vanadium.
Figure 1E:
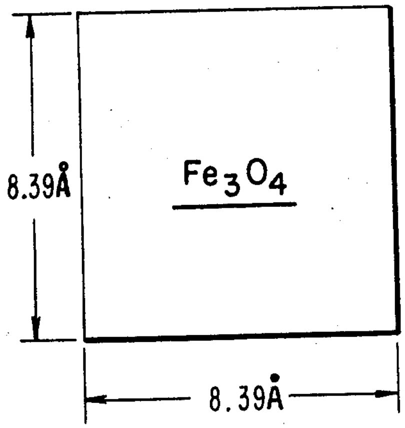
FIG. 1E is a diagram showing the square dimensions of an $Fe_3O_4$ cell which can build upon the structure provided by the corners of the chromium or vanadium arrays shown in FIGS. 1C and 1D.

Table I summarizes the essence underlying the instant invention. It shows for $\alpha Fe_2O_3$, $Fe_3O_4$ and $\gamma Fe_2O_3$ the crystal structure, lattice constants *a* and proper texture (preferred orientation). Note that the lattice constants for $Fe_3O_4$ and $\gamma Fe_2O_3$ are remarkably similar and approximately 8.35A. Table I also shows this information for three possible thin film underlayer materials, MgO, V, and Cr. Both Cr and V are expected to form (110) texture. FIG. 1A shows the (110) plane of the basic cubic cell of these two elements (Cr and V). FIGS. 1B, 1C, and 1D indicate that 3 × 2 arrays of these (110) planes lead to approximately square cells of dimensions very close to those of the $Fe_3O_4$ lattice constant. (Cr — 8.16A × 8.64A; V — 8.54A × 9.09A versus 8.39A × 8.39A for $Fe_3O_4$.) FIG. 1E shows an $Fe_3O_4$ cell. Thus, this degree of similarity has been found to favor the epitaxial formation of $Fe_3O_4$ on top of Cr and V.

The validity of the epitaxial concept was tested by selecting single crystal substrates of MgO and spinel with right and wrong crystal cuts. It was, indeed, verified that only the (100) cuts of these substrates led to the formation of single crystal $Fe_3O_4$. We also tested a polycrystalline underlayer of titanium which has a hexagonal crystal structure and which therefore did not yeild magnetic iron oxide films. Deposition of $Fe_3O_4$ films directly onto glass substrates (amorphous structure under otherwise identical conditions to those used in Example I below) also led to non-magnetic iron oxide films.

In Table II, the values for *a*, *b* and 3*a* in FIGS. 1A and 1B are shown for b.c.c. materials. Except for iron, which is undesirable because of its susceptibility to corrosion, and chromium and vanadium, none of the other b.c.c. materials closely match the cell dimensions of ferrites, particularly those of $Fe_3O_4$ and $\gamma Fe_2O_3$. For example, the tantalum structure according to FIG. 1B would be 9.33A (2*d*) × 9.90A (3*a*) which would not fit with $Fe_3O_4$ at 8.39A × 8.39A. Considering the materials with a face-centered cubic structure, their dimensions and (111) texture, which has threefold symmetry, rarely match the cubic cell of most materials includng $Fe_3O_4$ (8.39A × 8.39A) and $\gamma Fe_2O_3$ (8.30A × 8.30A). Deposited MgO has the proper structure 8.4 × 8.4, but the wrong texture (not 100).

Table II

| | Crystal Structure | a | c | $b=\sqrt{2}a$ | 2b | Magnetic | 3a |
|---|---|---|---|---|---|---|---|
| Cr | bcc | 2.88 | | 4.08 | 8.16 | No | 8.64 |
| Ag | fcc | 4.08 | | N/A* | N/A | No | N/A |
| Co | hcp | 2.51 | 4.07 | N/A | N/A | Yes | N/A |
| Au | fcc | 4.07 | | N/A | N/A | No | N/A |
| Fe | bcc | 2.86 | | 4.04 | 8.09 | Yes | 8.58 |
| Ni | fcc | 3.52 | | N/A | N/A | Yes | N/A |
| Cu | fcc | 3.61 | | N/A | N/A | No | N/A |
| V | bcc | 3.03 | | 4.27 | 8.54 | No | 9.09 |
| Ti | hcp | 2.95 | 4.73 | N/A | N/A | No | N/A |
| Mn | complex cubic | 8.91 | | N/A | N/A | No | N/A |
| Ta | bcc | 3.30 | | 4.67 | 9.33 | No | 9.90 |

*N/A - Not applicable.

Figure 2:
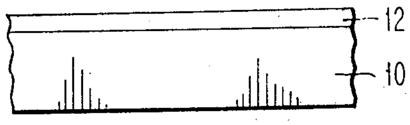
FIGS. 2 and 3 are cross-sectional views showing products obtained by the method of the invention.

Referring to FIG. 2, a substrate 10 is composed of a rigid non-crystalline material such as glass which is amorphous or a flexible medium such as an organic chemical polymer stable at temperatures of 200° C and the like, which may include a polyimid (KAPTON) or poly (parabanic acid). On the substrate 10, a thin film (250–10,000A) of vanadium or chromium is deposited by evaporation ($10^{-6}$ Torr) or sputtering in argon ($10^{-2}$ Torr) at a substrate temperature between 200° and 250° C.

Figure 3:
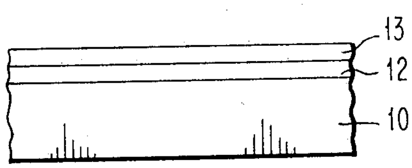

In FIG. 3, the resulting product of the above steps is shown with a new iron oxide layer 13 (100A to 100,000A) thereon which is deposited by sputtering. Preferably R.F. sputtering is employed with a target of magnetite ($Fe_3O_4$), and a power input level of 200–300 watts developing a lKV potential on the target with a 0–200 volt bias on the substrate. The biases and power can be modified by factors greater than 2:1 producing similar results.

Specific examples of practice of this method are as follows:

EXAMPLE I

A 2000A chromium film was sputtered onto pyrex glass at a substrate temperature of 200° C in an R.F. sputtering chamber with a power of 300 watts at a pressure of $2 \times 10^{-2}$ Torr argon with a potential of 1000 volts on the target and 50 volts on the substrate. Then a 1000A $Fe_3O_4$ film was sputtered on top of the chromium film at a substrate temperature of 200° C in an R.F. sputtering chamber with a power of 400 watts at a pressure of $2 \times 10^{-2}$ Torr argon at about 1KV on the target and a substrate potential of 50 volts.

EXAMPLE II

A 2000A vanadium film was deposited the same way as the chromium film in Example I and all of the same steps were followed.

EXAMPLE III

A 2000A chromium film was deposited by means of electron beam evaporation onto glass substrates at a temperature of 200° C in a vacuum of $10^{-6}$ Torr and was then followed by the 1000A sputtered $Fe_3O_4$ film as in Example I.

A 2000A vanadium film was deposited as in Example III, and then followed by the 1000A sputtered $Fe_3O_4$ film as in Example I.

Reflection electron diffraction has shown that the chromium and vanadium films described above have a high degree of (110) texture on an amorphous glass surface. The orthogonal lattice vectors on (110) cuts of the b.c.c. (body-centered cube) structure for chromium and vanadium are 8.16A and 8.54A respectively, along the shorter sides and 8,64A and 9.09A, respectively, along the longer sides in a 2 × 3 matrix. These are a reasonable match for the 8.39A (100) cells of $Fe_3O_4$ and $\gamma Fe_2O_3$ but a very poor match for $\alpha Fe_2O_3$, and FeO. Although these underlayers are also a reasonable match for iron (Fe), the probability of getting pure Fe in the films is practically zero because Fe is very reactive in the presence of oxygen which is plentiful because an iron oxide source is being used. Thus, the epitaxial influence of the (110) textured polycrystalline domains of vanadium or chromium have resolved the deposition atmosphere problems experienced in previous attempts to make stoichiometric $Fe_3O_4$ and $\gamma Fe_2O_3$ films by direct deposition by reactive evaporation and/or sputtering as well as evaporation and/or sputtering from $Fe_3O_4$. It has been found by experimentation that stochiometry is necessary to prevent film corrosion and to achieve adequate magnetic characteristics.

The films produced by the Examples above have yielded a squareness $S^* = 0.7$ and an isotropic coercivity of 500 Oe. Both the chromium and vanadium underlayers worked equally well in the thickness ranges of 200–10,000A, sputtered or evaporated at substrate temperatures from 200° to 250° C. Deposition of a 1000A thick $Fe_3O_4$ film onto the above underlayers at a substrate temperature of 200° C has yielded very similar films to those on single crystals. The resulting $Fe_3O_4$ and $\gamma Fe_2O_3$ film shows properties which are quite independent of rather large variations in deposition conditions.

These films have been found to be extremely corrosion resistant even when exposed to humid environments which are catastrophic to most thin magnetic metallic films. Test conditions included maintaining the films for weeks at a time under 100% relative humidity at 100° C in controlled environments. Other corrosive atmospheres were also tried with no adverse effects.

As indicated above, a salient feature of this invention is the ability to synthesize stoichiometric $Fe_3O_4$, ferrite, and $\gamma Fe_2O_3$ films at very low temperatures of the substrate. This is a necessary condition for applications on flexible organic substrates. The substrate temperature could be further minimized by using a sputtering chamber designed for minimization of substrate heating due to electron bombardment. It contains a magnetic field which causes the electrons to be collected on a special anode removed from the substrate which permits sputtering at low substrate temperatures. Such equipment is provided by Sloan Technology Corporation under the trade name Sputter Gun.

Inert Deposition

Preferred target sources for sputtering and hearth sources for evaporation are $Fe_3O_4$, $\gamma Fe_2O_3$, and $\alpha Fe_2O_3$. Where desired, more complex ferrites such as $CoFe_2O_4$, etc. can be used.

Reactive Deposition

Less desirable sources are applied by reactive deposition techniques such as depositing iron in the presence of oxygen. These are less desirable because they require critical control of the relative amounts of the constituents.

We claim:

1. A method of depositing magnetic ferrite films on a substrate comprising the sequential steps of:

placing a substrate having a surface to be coated in an evacuable deposition chamber, vacuum depositing on said substrate a polycrystalline film of a first material having a crystal structure with lattice constants on the order of 8.35A by 8.35A square and then epitaxially vacuum depositing on said polycrystalline film a magnetic ferrite film having a cubic spinel structure, said polycrystalline film providing characteristics favorable to epitaxial ferrite deposition.

2. The method of claim 1 wherein the steps of vacuum depositing are performed by sputtering.

3. The method of claim 1 wherein said polycrystalline film has a (110) cubic structure and a texture favoring growth of $CoFe_2O_4$, $Fe_3O_4$ and $\gamma Fe_2O_3$ and said ferrite is selected from $CoFe_2O_4$, $Fe_3O_4$ and $\gamma Fe_2O_3$.

4. The method of claim 1 wherein said magnetic ferrite film comprises magnetic iron-oxide which is deposited reactively upon said polycrystalline film by vacuum depositing iron from a source in an atmosphere containing oxygen.

5. A method in accordance with claim 1 wherein said polycrystalline material has lattice constants in the range between about 8.16A and 8.54A.

6. A method of depositing magnetic ferrite films on a substrate comprising the sequential steps of:

placing a substrate having a surface to be coated and comprising a substantially noncrystalline material in an evacuable deposition chamber, vacuum depositing a polycrystalline film of a first material having b.c.c. crystal structure characteristics with a (110) texture consisting of a material selected from the group consisting of vanadium and chromium, and then epitaxially vacuum depositing magnetic ferrite on said polycrystalline film.

7. The method of claim 6 wherein said first material is deposited in said chamber with a controlled atmosphere within said chamber by a method selected from the group consisting of sputtering in an inert gas atmosphere on the order of $10^{-2}$ Torr and evaporation in a vacuum on the order of $10^{-6}$ Torr.

8. The method of claim 7 wherein said ferrite material comprises magnetic iron-oxide which is deposited by sputtering.

9. The method of claim 8 wherein said iron-oxide comprises magnetite and is obtained by sputtering of a target comprising magnetite.

10. The method of claim 8 wherein the substrate is an organic polymer and the steps of depositing are performed at a substrate temperature below 225° C.

11. The method of claim 7 wherein said ferrite material comprises magnetic iron-oxide which is deposited by evaporation.

12. A magnetic thin film ferrite epitaxially deposited upon a substrate coated with an intermediate thin film layer of a metal having a crystal structure with lattice constants yielding crystal structures on the order of about 8.35A × 8.35A square, said metal having been deposited by a method selected from the group consisting of evaporation at a pressure on the order of $10^{-6}$ Torr and sputtering in an inert atmosphere at a pressure on the order of $2 \times 10^{-2}$ Torr, and then epitaxially vacuum depositing said ferrite on said intermediate layer to form a cubic spinel structure upon said intermediate layer.

13. A method of forming an epitaxial magnetic ferrite film consisting of at least one of $Fe_3O_4$ and $\gamma Fe_2O_3$ comprising the sequential steps of sputtering a thin film of a metal selected from vanadium and chromium onto a substrate, then vacuum depositing said epitaxial magnetic ferrite film on said film of a metal.

14. A low temperature method of forming an ironoxide magnetic film of material comprising $\gamma Fe_2O_3$ and $Fe_3O_4$ comprising the sequential steps of vacuum depositing a 200A to 10,000A thick metal film of a metal selected from the group consisting of chromium and vanadium on a substrate held at a temperature between 200° and 250° C to form a b.c.c. structure with (110) texture, and thereafter sputtering a 100A to 10,000A thick epitaxial layer of magnetic iron oxide at a substrate temperature between 125° to 225° C in an inert gas atmosphere at a pressure of about $2 \times 10^{-2}$ torr to form said magnetic iron oxide film on said metal film.

* * * * *